US010528757B2

(12) United States Patent
Naveed

(10) Patent No.: US 10,528,757 B2
(45) Date of Patent: Jan. 7, 2020

(54) SYSTEMS AND METHODS FOR CLINICAL STUDY MANAGEMENT

(71) Applicant: Fahad Naveed, Sugar Land, TX (US)

(72) Inventor: Fahad Naveed, Sugar Land, TX (US)

( * ) Notice: Subject to any disclaimer, the term of this patent is extended or adjusted under 35 U.S.C. 154(b) by 0 days.

(21) Appl. No.: 13/691,702

(22) Filed: Nov. 30, 2012

(65) Prior Publication Data

US 2013/0145479 A1    Jun. 6, 2013

Related U.S. Application Data

(60) Provisional application No. 61/565,866, filed on Dec. 1, 2011.

(51) Int. Cl.
*G06F 21/62* (2013.01)
(52) U.S. Cl.
CPC .......... *G06F 21/6245* (2013.01); *G06F 21/62* (2013.01)
(58) Field of Classification Search
CPC ................................................ G06F 17/30339
See application file for complete search history.

(56) References Cited

U.S. PATENT DOCUMENTS

| | | | |
|---|---|---|---|
| 6,519,601 B1 * | 2/2003 | Bosch | |
| 2005/0091287 A1 * | 4/2005 | Sedlar | ......................... 707/200 |
| 2008/0154983 A1 * | 6/2008 | Lee | ......................... G06F 8/71 707/717 |
| 2013/0006963 A1 * | 1/2013 | Chaliparambil | ....... G06Q 10/10 |
| 2013/0041677 A1 * | 2/2013 | Nusimow | .............. G06Q 50/22 705/2 |

* cited by examiner

*Primary Examiner* — Simon P Kanaan

(57) ABSTRACT

Electronic systems and methods for managing and auditing Clinical Trial data includes using storage and classification of all data. New data is added to the data storage system and designated as a current version, rather than deleting previous data and storing only a single version. Further identifying information about the data, including the user name who modified it and the date of modification, may also stored. Computer users are authenticated by the systems and methods and may then add and alter data according to user permissions. Further systems and methods include electronic billing for clinical trials based on statuses of clinical trial procedures. Prices for procedures may be assigned by appropriate users and billing mechanisms may proceed based on statuses of the procedures and not necessarily on the status of the entire clinical trial.

20 Claims, 4 Drawing Sheets

SYSTEMS AND METHODS FOR CLINICAL STUDY MANAGEMENT

CROSS-REFERENCE TO RELATED APPLICATION

This application claims the benefit of U.S. Provisional Application No. 61/565,866 filed Dec. 1, 2011.

FIELD OF THE INVENTION

The present invention is generally related to the field of electronic medical data storage and management.

BACKGROUND

Clinical studies are necessary in medicine to measure the effects of healthcare discoveries, including new devices and drugs. Many studies involve numerous patients; locations; doctors; original documents; and study guidelines, both scientific and governmental. In the past, data gathered during clinical studies were collected on paper. Patient charts, drug reactions, and doctor analyses are some examples of information that are parts of a clinical trial. All this information must be collected, verified, and often re-verified several times so that data can be accurately measured, recorded, and compared. In some clinical study management systems, physical documents must then be manually typed into a computer if they are to be accessible in electronic format. This manual input increases the amount of human error in the system.

Verification of this data and other information of the clinical study requires many hours of checking and re-checking, and demands the auditor to be on-site in order to review the documents that are on-site. An auditor would then have to travel to the study location, usually several times for several iterations of auditing. The travel expenses, auditor time, and redundancy required for both of those to ensure data integrity raise costs to an estimated $23 billion each year. Clearly there is a need for a clinical study approach that ensures data integrity while reducing costs.

Similarly, medical charts are stacks of documents that have been written, rewritten, crossed out, initialed, erased, and altogether worn out. A patient chart is passed around from doctor to nurse to administrator and back around again, many times during a patient stay. Research charts are similarly passed around. Printed text becomes difficult to read, signatures and handwriting become illegible, and papers get torn, frayed, and misplaced. There is a need for a medical chart that is authentic, legible, attributable, and easily accessible. Modern clinical studies also demand decreases in the costs of the management and administration; increases in data security and integrity by, among other methods, reducing the amount of human error introduced into the system; and all this while maintaining the active participation of study personnel such as patients and doctors.

Over time, some aspects of clinical studies have been automated. Computers have been used to compile the data after it was already collected manually. Computer software methods have been used to attempt to store structured and unstructured data uniformly. Computers and network communication have opened up the possibility of increased efficiency and capability, but many inefficiencies remain. Repeated verification of source documents is time consuming and often requires reviewing the physical documents personally. Compliance with governmental regulations is often underserved or completely ignored in current automated applications. Information and data is often difficult to transport and communicate to and from a clinical study location. Data and information integrity is often suspect as written documents can be erased or misplaced. Yet information security and integrity are critical aspects of a study that must be carefully planned; and while some technology has attempted to improve upon certain parts of a clinical study, problems exist in verifying the integrity of the data and in the manual processes that remain and that create productivity bottlenecks. There is a need for comprehensively managing a clinical study where efficiency is maximized and verification is easy and inherent.

SUMMARY

Embodiments of the present invention include systems and methods for cloud-computing models for a clinical study. The invention utilizes data integrity at an elemental level—that is, at the most basic level of each data entry—to ensure all study information is Attributable to a single person involved in the study, Legible, Contemporaneous with the event it records, Original, and Accurate (ALCOA). This ALCOA acronym is used by the U.S. Food and Drug Administration (FDA) as its standard in research endeavors, including in clinical trials. And it is this same standard the present invention completely satisfies on all points. Information and data may be organized into patient charts. These charts, as they exist electronically on the clinical study system, also possess the highest level of data integrity since every piece of data and information contained therein has been verified through entry authentication, and that authentication information becomes part of the record which is accessible and can be reviewed through auditing.

The present invention also includes embodiments for an integrated billing and budgeting system. These financial systems are assigned to the particular medical procedure involved as well as to the overall visit. The prices and costs of individual medical procedures and visits may be set according to specific clinical study needs. These prices and costs may be independent of other prices and costs within a study and from other studies. The costs and prices may be triggered by events designated in the study setup. Triggers may include any designated event such as completion of a procedure, completion of a visit, expiration of time, or other specified event. When the procedure has been completed, it is designated by the user as complete and then saved to a data storage system. The resulting financial information may then be communicated to destinations within or outside the clinical study system. Upon completion, a procedure is automatically billed since the clinical study system is setup with actions to take once a procedure completes. These actions include, but are not limited to, updating relevant fields in a data storage system, organizing this procedure and other appropriate procedures for a billing process, and sending billing information through a computer network to corresponding destinations. Some methods through which financial transactions may be sent include, but are not limited to, printouts, facsimile machines, email, and mobile phones, among other forms of electronic communication. This billing information may be processed even though the status of an entire visit is not yet complete, and it may be processed also when a visit has completed.

Further embodiments include managing a clinical study through utilization of cloud-computing systems and methods. Cloud-computing resources that can be used for a clinical study may include availability of software and hardware, as well as storage of data and information. The resources may be scalable and modular, allowing for efficient and customizable allocation based on the needs of any given clinical study. The resources may be remotely located, physically apart from clinical study locations. The resources may be used for many studies, including concurrently, and may include redundancy as a means for efficiency, integrity, and security, for example. Even when remotely located, the resources may be actively and constantly connected to clinical study locations through a communication network, for example, a computer network. Resources for a clinical study may be located on a cloud computing system before, during, and after the clinical study has existed and resources may be accessible at any time from the cloud computing system.

The invention may use administrative information in managing a clinical study. Management of a clinical study includes, but is not limited to, determining protocols, implementation, and storage of study information. The invention may acquire information, it may generate information, and it may use a combination of acquisition and generation. Information may include source documents and source document templates, for example, that can be used for data gathering during a clinical study. Information may also include administrative information regarding the design and implementation of the clinical study, patient data gathered for the study, and analysis of the study, among other types of information and data. The information may be stored, including electronically, and used for study purposes. The invention may also use government compliance requirements in managing a clinical study. The invention may use this acquired and generated information, and it may use other resources as well. The invention may collect data during a clinical study through manual collection and the use of mobile electronic devices. A single device may be used and many devices may be used in concert and autonomously to gather patient and visit data. The patient and visit data may also include data originally created in physical, as well as electronic, format. In managing the clinical study, the invention may share study information, data, and status both within and outside the invention. Reports, notifications, and access to study information and data are some of the ways the invention may communicate contents and other aspects of a study to both users of the study as well as destinations outside the study. Users may include persons utilizing a device or system that can access a clinical study system. Users may also include applications that access the systems and computer destinations, including printing devices, that can access a system or can receive system information. The invention may verify data and information with government compliance and clinical study requirements in managing the study and determining study completion. The invention may go through many and differing iterations of verification steps before determining a status for a clinical study. This description of one embodiment is intended for illustration only and should not be read to limit the flexibility or scope of the invention.

BRIEF DESCRIPTION OF THE DRAWINGS

These and other aspects of the present invention may be better understood when considered in the light of the accompanying drawings, provided for illustrative purposes only. These diagrams are merely illustrations of one embodiment of the present invention and should not be viewed as limiting the inventive concept.

DETAILED DESCRIPTION

Figure 1:
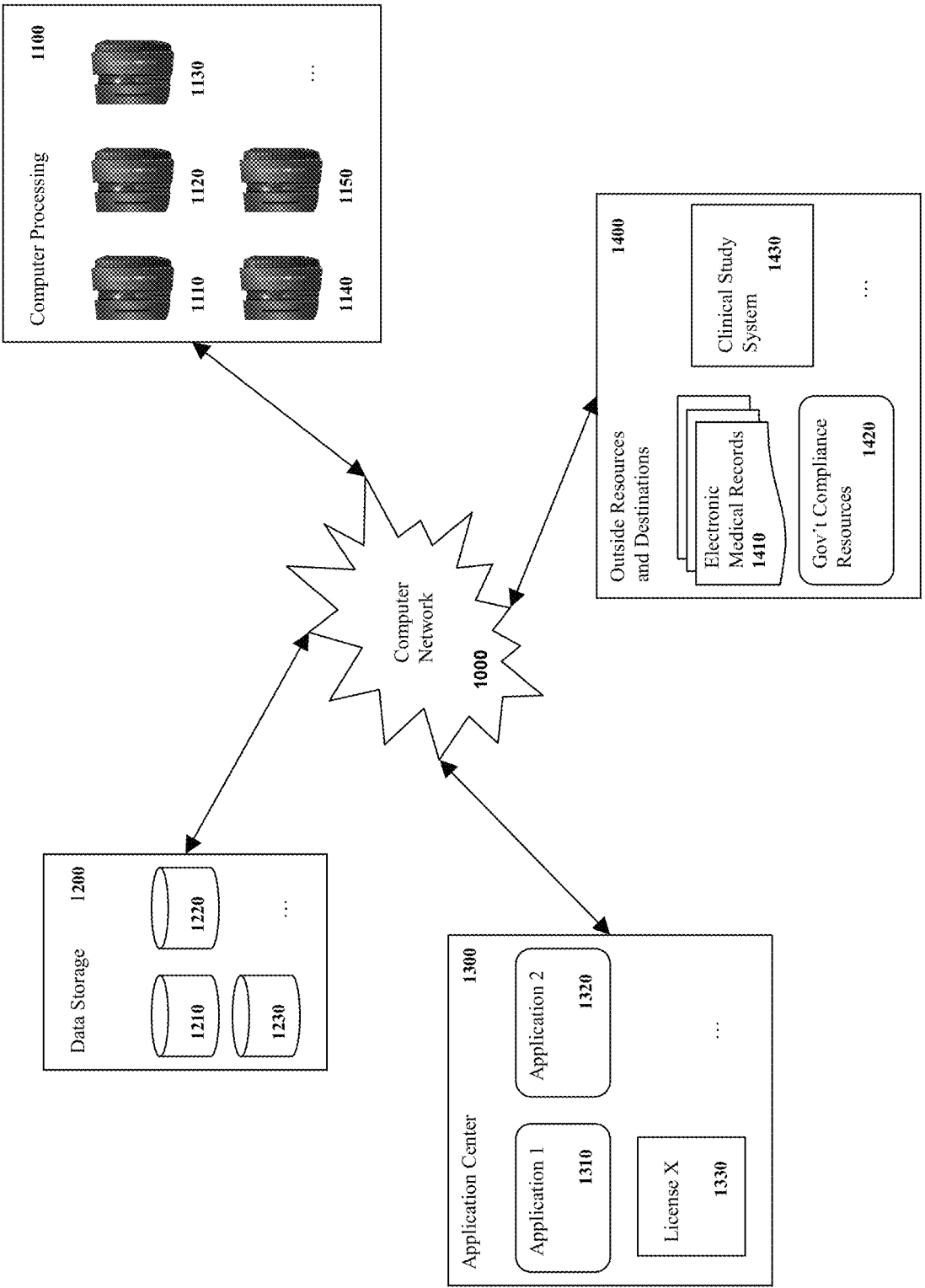
FIG. 1 is a block diagram illustrating an exemplary cloud computing model according to one embodiment of the present invention.

The present invention may be described in terms of various functional components and processes. The invention includes degrees of modularity and scalability allowing for implementations of the inventive concept in large, small, complex, and simple embodiments, and all embodiments in between. Therefore, deviation from the illustrated embodiment does not necessarily render an implementation outside the scope of the inventive concept. In one embodiment of the present invention, a cloud computing system exists which may be located remotely relative to a clinical study location and may be used by many clinical studies concurrently and at differing times. One illustration of such a system is represented in FIG. 1. The remote computing system is inherently scalable and modular so any representation of a limited number of computer processors 1100, data storage units 1200, applications and application-related items 1300, and outside resources and destinations 1400, should be attributed only to the limits of graphic illustration and should not be considered restrictions on the inventive concept. For example, data storage 1200 and computer processing 1100 may exist on a single computing device and application center 1300 and outside resources 1400 may refer to the same object, depending on the particular embodiment of the present invention. An ellipsis, present in each illustrated object of FIG. 1, is intended to also represent the scalability and modularity of a cloud computing system as more and differently sized components of the same types already present within an object may be added and removed from each object.

In one embodiment of the present invention, a cloud computing system may be connected to a clinical study system through computer network 1000. The connection may be active, passive, occasional, and constant. The network may be any communication apparatus or method between computing components including, but not limited to, a local area network, a wide area network, the Internet, an individual computer's motherboard, and a single network cable, to name a few examples. The network connection may be wired, wireless, Bluetooth, and infra-red, among other types of connectivity. There may be many networks in use on a single cloud computing system and utilized for a single communication. The cloud computing system may retain data and information for data storage 1200 on a computer readable medium, such as memory. The memory may be optical and magnetic, among other types that may be used in computers, and may include a plurality of storage devices, here illustrated for exemplary purposes as units 1210-1230. Although similarly illustrated, the data storage units 1210-1230 may represent different types of storage, e.g. both optical and magnetic in the same embodiment. The data storage units may be accessed through a single network connection 1000 and they may span a plurality of networks 1000.

In one embodiment of the present invention, computer applications may be used by a cloud computing system and a clinical study system 1430. The applications may reside on the cloud computing system in the application center 1300. This may be a different physical location than where data storage 1200 resides or it may be the same physical location. There may be many applications, here illustrated for example as Application 1 1310 and Application 2 1320, and they may include CLINICAL CLOUD™ applications, internal cloud computing applications, and third party applications, to name a few. The applications center 1300 may also include other application-related information such as software licenses, here illustrated as License X 1330. There may be a plurality of applications and licenses present on the cloud computing system and they may be accessible through a single network connection and they may span a plurality of network connections. There is no required relationship between the number and type of applications and the number and type of software licenses available on the cloud computing system. In one embodiment of the present invention, a user logs in to Application 1 1310 through application center 1300 residing on the user's computer. Application 1 1310 verifies its presence through License X 1330 and authenticates the user through communication with data storage 1200 and through processing by computer processing 1100 via computer network 1000. The communications by and between application center 1300, data storage 1200, and computer processing 1100 may be through a single computer network 1000, e.g. a computer motherboard, or the communications may be through a plurality of computer networks represented here by computer network 1000.

In one embodiment of the present invention, a cloud computing system may acquire data and information through computer network 1000 including from outside resources 1400. Data and information may be communicated immediately through computer network 1000 including to an outside destination such as a clinical study system 1430, and the data and information may be stored indefinitely and communicated occasionally with outside destinations 1400. The cloud computing system may also exchange data and information with electronic medical records 1410, government compliance resources 1420, and other sources such as other clinical studies, other clinical study systems, and other clinical study cloud computing systems, for example. Some examples of government compliance resources include, but are not limited to, requirements of the Federal Drug Administration (FDA) and the Health Insurance Portability and Accountability Act (HIPAA), among others. There may be a plurality of outside resources and destinations for any cloud computing system and they may be accessible through a single network connection and they may span a plurality of network connections.

In one embodiment of the present invention, computer processing 1100 may be used to execute machine-readable instructions for a cloud computing system. The processing may use microprocessors of a type generally used in computing machines and it may use special purpose microprocessors such as microcontrollers, digital signal processors, and graphics processing units, to name a few. The microprocessors may utilize any architecture including, but not limited to, reduced instruction set computing (RISC), single core, and multi-core, to name a few. There may be a plurality of microprocessors for any cloud computing system and they may be accessible through a single network connection and they may span a plurality of network connections. The microprocessors utilized by a cloud computing system may be shared among cloud computing systems. Microprocessors may be of a single type and architecture and they may be of different types and architectures.

A cloud computing model for use in clinical studies may stand alone as a system and as a method that can be used with any clinical study system. The cloud computing systems represented in FIG. 1 and the methods described herein may also be used in conjunction with a clinical study management system 1430. These systems and methods may work with a plurality of clinical study systems and a plurality of clinical studies both concurrently and at different times. These systems and methods may also work in conjunction with other cloud computing models, both of the same design and of a different design. In one embodiment of the present invention, cloud computing systems and methods are used in conjunction with systems and methods of an electronic clinical study management system, such as a CLINICAL CLOUD™ software system. For example, a cloud computing model may receive source templates from a clinical study system 1430 for a given clinical study. A cloud computing system may then store these templates in data storage unit 1210, for example, for access by clinical study system 1430 that can be used by a clinical study. A cloud computing system may also make available these templates for use by different clinical study systems at the same time or at different times than the given clinical study. Similarly, in one embodiment, a cloud computing system may use computer microprocessors 1140 and 1150, for example, in executing machine-readable code for a given clinical study and it may use one or more of those same microprocessors in executing machine-readable code for other clinical study systems. This is in addition to the ability of the cloud computing system to use different microprocessors for different clinical study systems. The same scalability, flexibility, and modularity is also true of a cloud computing system in its allocation and usage of applications and licenses, for example, Application 2 1320.

Figure 2:
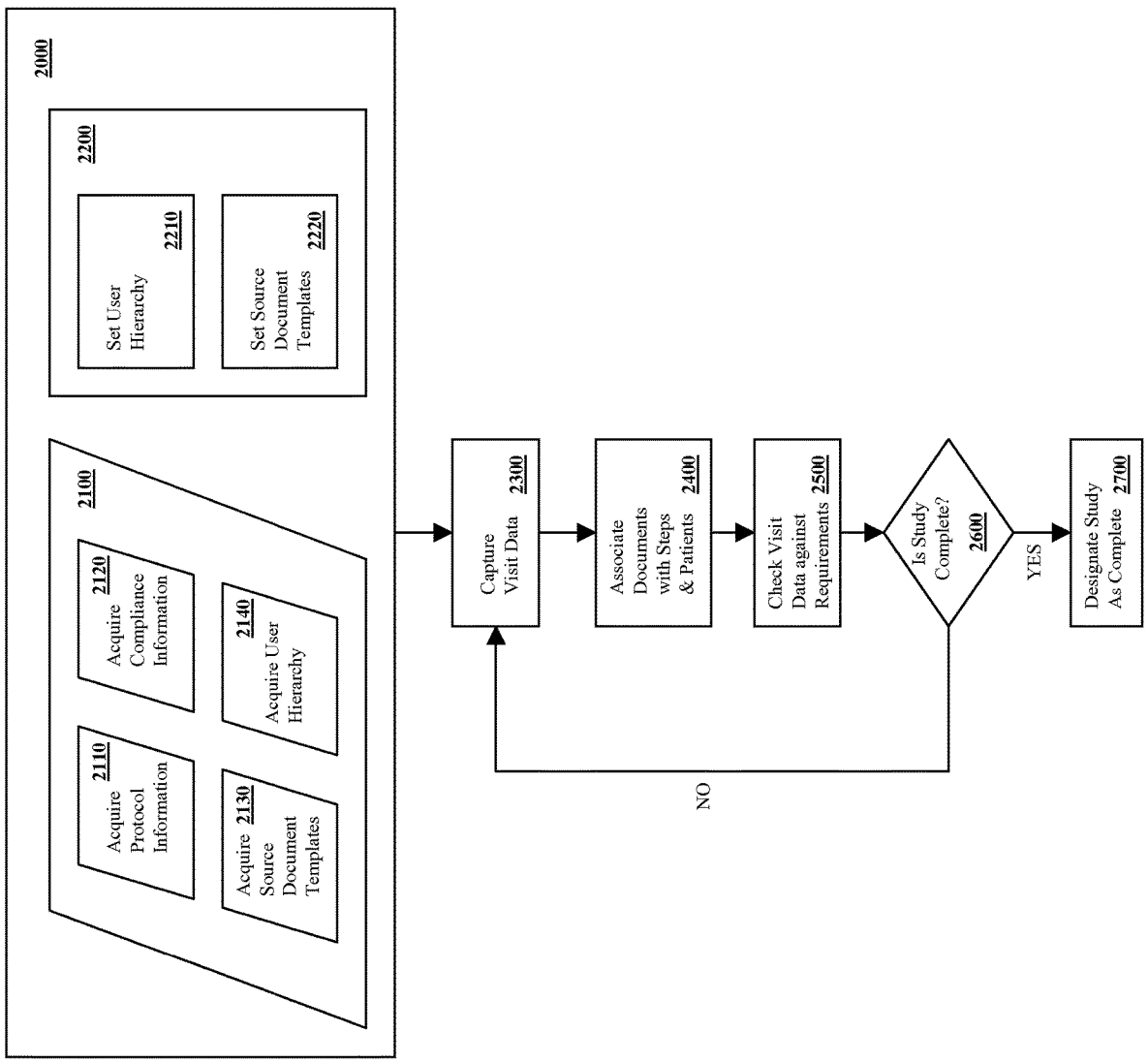
FIG. 2 is a flow chart illustrating a method of managing a clinical study according to one embodiment of the present invention.

The present invention is also directed to a method of managing a clinical study. Management of the study may include functional aspects of the study including, but not limited to, design, implementation, execution, storage, and archival of the study and of the data and information associated with it. One illustration of such a method is represented in FIG. 2. This diagram is merely an illustration of one embodiment of the present invention and should not be viewed as limiting the inventive concept. The order of the steps as illustrated is merely to aid in understanding of one embodiment of the present invention and this illustrated order should not be viewed as necessary to implement the invention. Furthermore, the shapes chosen to represent some elements of the invention are only illustrations and should not be viewed as limiting, even though the shapes may have specific meanings in other flow charts and in differing aspects of this flow chart. In one embodiment of the present invention, information may be acquired 2100 which includes, but is not limited to, protocol information 2110, government compliance information 2120, source document templates 2130, and user hierarchy 2140. The acquiring of information 2100 includes, but is not limited to, actively seeking out information located elsewhere, passively receiving information from an outside location, and actively and passively acquiring the information locally, among other methods of data acquisition. This data may include information about a purpose and design of the study, for example. The information may also include descriptions of an implementation of a study including but not limited to, how, when, and by whom a study will be executed. The present invention may acquire data relating to government compliance 2120. This information may include requirements from federal sources such as the FDA and the HIPAA, among others. One embodiment of the invention includes accessing government compliance information via a computer network 3000. The present invention may acquire source document templates 2130, for example, and capture source data related to steps of a clinical study. These templates may include lists of data that may be gathered during a study. Patient visit data gathered by physicians is one type of data the lists may be designed to capture. The present invention may acquire user hierarchy information 2140. This user hierarchy information may include, but is not limited to, user access levels, notifications, and user preferences, among other things. The present invention may also acquire other clinical study information 2150 which may include, but is not limited to, types of information which may be useful for managing a clinical study, for example, metadata and network data, among other types. This information, if acquired, may be from a cloud computing system, among other possible sources. Some information may not be acquired and may be, for example, pre-existing on a clinical study system.

In addition to or in place of acquiring user hierarchy and source document templates, the present invention may also set and generate these and other clinical study guidelines 2200 according to its own internal procedures. These procedures exist in the computer program and are designed to generate standardized forms. Forms may also be generated by a user after which the user-generated forms will reside in a document library along with any standardized forms and will be accessible to the present clinical study, as well as other ongoing and future clinical studies. This internal setting and generation of user hierarchy 2210 and source document templates 2220 may be in addition to acquisition 2100 and it may be independent of outside acquisition. Generating of clinical study information may be accomplished on any computer device of a system. In one embodiment, source document templates are generated 2220 and user hierarchy is assigned 2210 on a study coordinator system 3200. System-generated templates and access information may be communicated to mobile computing devices 3100 and other system destinations through computer network 3000. User hierarchy may include, but is not limited to, permissions within and over the clinical study, notifications, and user preferences. In one embodiment, source document templates may be generated by the present invention 2220. These dynamic templates may be in addition to and may be in place of acquiring the templates 2130. Templates may include standardized forms common to many different clinical studies and forms that are more specific to a particular study. The present invention may also set other study guidelines. Some illustrative examples of these other guidelines include, but are not limited to, clinical study schedule, storage data management, and outside clinical study reference.

The present invention includes capturing visit data 2300. This data may include patient data, site-specific data, and other data related to a clinical study. This may include data captured in real time, in bulk, and from other clinical study systems and locations. The data may pertain to one particular step and to several steps of the study and to other aspects of a study not involving any steps. In addition to patient information, other information may be captured including, but not limited to, visit metadata exemplified by the username of a person entering patient data, dates and times of data collection, and location of a patient visit, to name a few. The forms used to obtain this patient data may be specific to a clinical study or they may be generalized. The forms may be stored on a study system; acquired by a system, electronically and physically, for example; and the forms may be dynamically generated by a system. In one embodiment of the present invention, patient data may be gathered by a system on mobile computing devices 3100 and on physical documents, among other methods of data gathering. Patient data in electronic format may be immediately transmitted via computer network 3000 or it may remain on an initial data gathering device and later transmitted. In one embodiment, a mobile computing device 3100 is used by a primary investigator 3320 to collect patient data. Some patient data may already exist on the device 3100 and a primary investigator may add to the data, alter it, and replace it in collecting more data. Data may be stored on a device 3100 and it may be sent, immediately and eventually, to another device on the system as well to a device outside the system, for example to a cloud computing system.

Visit data may be compared 2500 to governmental compliance regulations and other clinical study requirements. The present invention may use study requirements, including government compliance regulations, independently, together, and in combination with other factors to make a determination about the visit data. In acquiring governmental compliance regulations and clinical study requirements, a clinical study system may initiate contact through a computer network 3000, the system may passively receive the regulations and requirements through computer network 3000, and regulations and requirements may already exist on specified device. If regulations and requirements do not already exist on a specified device, they may be acquired from another device either on a study system or outside a system. The method may then make a determination as to whether visit data has satisfied the requirements 2600 of a clinical study.

Visit data and study information may be stored in a data storage system 3500. The data storage system may be located on a mobile computing device 3100 used in data gathering and it may be located on a separate computing device. The separate computing device may be located within a clinical study system, on a cloud computing system, and it may be outside these systems. A data storage system may also be split among devices both within a clinical study system and outside it. In one embodiment of the present invention, data and information may be stored 2700 when a study is complete. The storing process may involve transferring and copying data and information among separate devices and separate applications. In one embodiment of the present invention, data and information are electronically sent from a coordinating system 3200 to a data storage system 3500 through computer network 3000 when a study is completed. In another embodiment, data and information remain in an original system and are designated as being completed. Data and information from past studies may be stored on a computer system separate from a system used to implement the initial data gathering of the clinical study. Some illustrative examples of a data storage system include, but are not limited to, a cloud computing system, a $3^{rd}$ party computer server system, a different location on the same computing device, and the same location on the same computing device, to name a few.

The present invention may associate documents with steps and patients 2400. At any time before, during, or after administration of a clinical study, the invention may acquire information and documents related to the clinical study. In one embodiment, the invention may associate a newly acquired document with an existing group of documents and information already present in the clinical study system and the present invention may create a new group for the newly acquired document and information. This association includes, but is not limited to, acquiring documents from a cloud computing system as well as linking documents to other documents stored on a cloud computing system. In one embodiment of the present invention, a new patient chart is faxed to the clinical study system and immediately made available to users of the system as well as to users of a cloud computing system. In managing a clinical study system, the present invention may check visit data against requirements 2500. These requirements include, but are not limited to, the requirements acquired 2100 in initial stages of the clinical study. The present invention may compare data collected during the clinical study against governmental requirements. In one embodiment of the present invention, a clinical study system retrieves compliance requirements from a government website and then compares these findings with data captured during the clinical study. If the data is found insufficient relative to the government compliance requirements, the present invention may then require more data to be collected in order to meet governmental requirements. A clinical study may be determined to be complete 2600 based on governmental compliance, the amount of data gathered, and other clinical and business rules determined by a clinical study system and users. In one embodiment of the present invention, designating a study as complete 2700 triggers a financial system to communicate billing information to an appropriate destination. The communications triggered by completion of a study may be in addition to billing communications triggered by completion of a single medical procedure or visit. Even after a study has completed, data and information may be added as users deem necessary. Any modifications made do not change the value as it exists in data storage. Instead, a new value is added, for example as a new record with a later entry date, and the previous value remains in data storage and may be reviewed including for auditing purposes. All prior values may be stored and reviewed by a user with appropriate data privileges and, in this way, an auditing trail will be comprehensive. Data storage may include, but is not limited to, transmitting and copying study information and data to a cloud computing system and transmitting and copying them to a third party system, for example, for storage and backup. In one embodiment of the present invention, clinical study data and information may be stored on a cloud computing system including by designating relative data and information as completed rather than, for example, as active. If a clinical study is found to not be complete, the present invention may capture more data with the possibility of satisfying clinical study completion thereafter. Data and information are stored, including for backup purposes, even if a clinical study is not determined to be complete.

Figure 3:
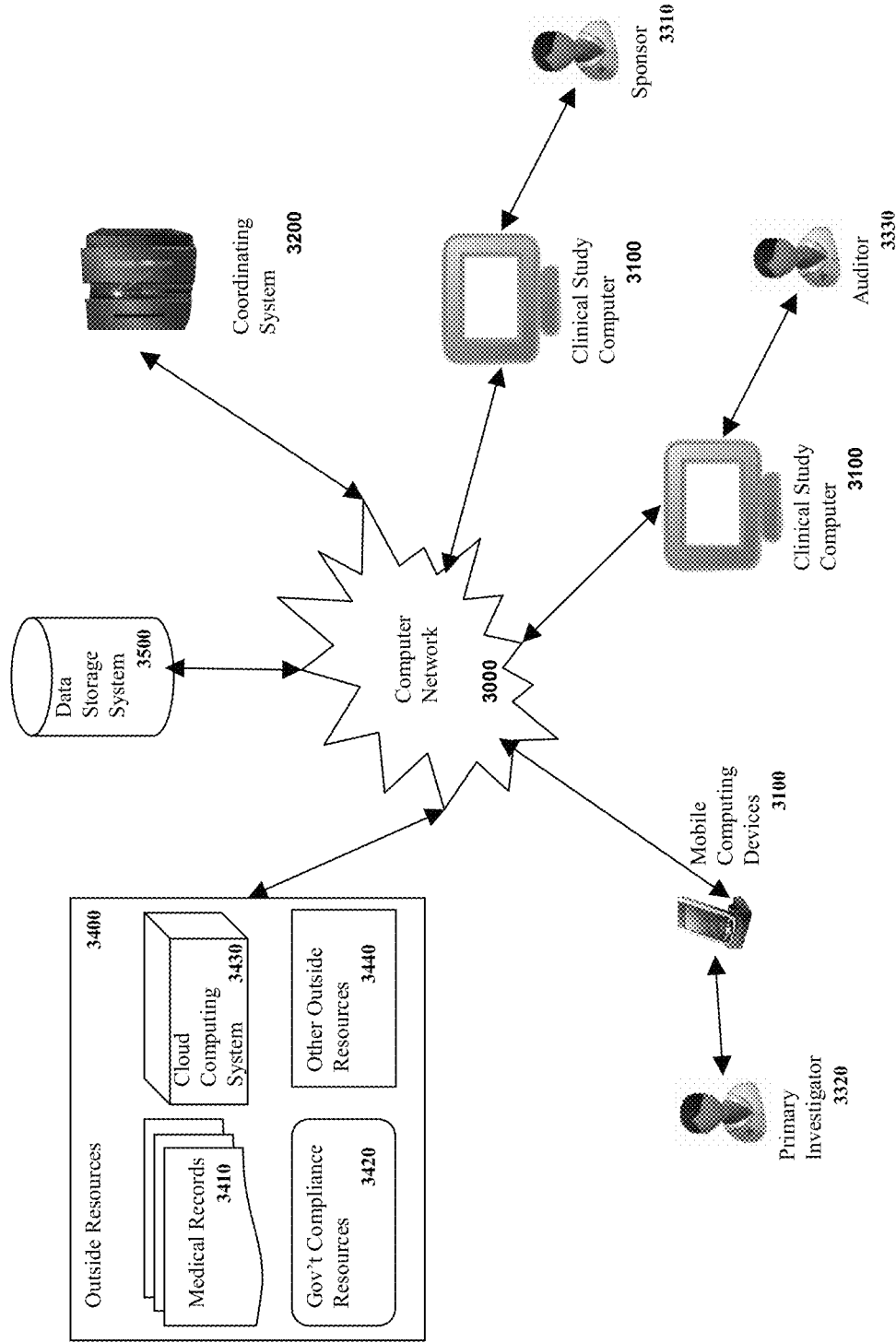
FIG. 3 is a block diagram illustrating an exemplary system architecture utilizing a cloud computing model according to one embodiment of the present invention.

One embodiment of the present invention is an electronic solution for clinical study management. The solution may be implemented by a machine executing instructions, the instructions which may be stored on a machine-readable storage medium. For example, the present invention may employ various devices, communication systems, network architectures, interfaces, and the like, which may comprise some or all of the components and processes, and may be under the control of one or more microprocessors or other control devices. Furthermore, the present invention may employ a number of conventional techniques for data entry, processing, storage, communication, and the like. One illustration of such a solution is represented in FIG. 3. An electronic solution may include, but is not limited to, systems for communication, storage, input, display, and analysis of information and data, among other things. These systems may include subsystems to carry out the desired functionality, and these subsystems may be of a complexity equal to the complexity of the systems. Each system may comprise a separate computer processor and separate computer software application. In other embodiments, systems may share computer processors and applications. Separate systems may communicate with each other and with outside computing devices through a computer network 3000. Computing devices 3100 described herein may include devices generally accepted as being computers including machines employing any of various operating systems, hardware, and purposes, including, but not limited to, tablet PCs, laptop computers, mobile phones, and facsimile machines, to name a few. Multiple devices employed on a clinical study system may communicate through computer network 3000. This network may be the same type as computer network 1000 and it may be a type different from computer network 1000. In some embodiments of the present invention, computer network 3000 may also be the same network as computer network 1000. There may be many networks in use on a single clinical study system. In one embodiment of the present invention, there may be many devices within a study system that use a wireless computer network 3000 to communicate with each other and with other devices. An additional network on the same study system may include a computer motherboard on a particular computing device. In one embodiment, computer network 3000 is represented by a local area network to communicate between mobile device 3100 and coordinating system 3200. Some examples of mobile computing devices 3100 include, but are not limited to, tablet PCs, personal digital assistants (PDAs), mobile phones, laptop computers, and desktop computers, to name a few. In another embodiment of the present invention, an entire clinical study management system may reside on a single computing device where, for example, computer network 3000 is the device motherboard, one or more processors on the device is configured to run a coordinating system 3200, and data storage system 3500 is a database application on the device that stores data on a computer readable medium of the device. In another embodiment of the present invention, data storage system 3500 is represented by cache memory of a mobile computing device, the contents of the cache memory which can be communicated to a data storage unit of a cloud computing model. A data storage system 3500 may be used to store information and data. Information and data may pertain to a future clinical study, an ongoing study, and a past study, and they may pertain to other studies and events. In one embodiment of the present invention, a data storage subsystem is used for storage of completed clinical studies. Future, ongoing, and completed studies may be accessed for viewing by users such as primary investigators, auditors, and sponsors, among others, and the studies may also be accessed for modification and deletion by users with appropriate permissions. The user could then interface with the clinical study system through, for example, coordinating system 3200. A single computing device 3100 may communicate with outside sources 3400 through computer network 3000 such as a wireless internet connection. A user may include a primary investigator 3320, an auditor 3330, and a sponsor 3310, for example, and the user may access different aspects of the clinical study based on respectively different user permissions. In one embodiment, data and electronic forms showing information from other trials may be accessible to the auditor 3330 but not to the primary investigator 3320. A study coordinating system 3200 may be a mobile computing device and it may be used to manage an entire clinical study and to manage less than all elements of a clinical study. In one embodiment of the present invention, a coordinating system 3200 acquires study information from outside sources, sets study guidelines, and stores study data without being involved in data gathering. A coordinating system may also send notifications through computer network 3000 to designated users. Users may access coordinating system 3200 through computer network 3000 to manage study information and data. In one embodiment, a sponsor 3300 may receive notifications from study coordinating system 3200 and an auditor 3330 may access a clinical study system through clinical study computer 3100 and be able to view clinical study data.

Data and information that may be used by the present invention may exist in structured and unstructured formats. In one embodiment of the invention, unstructured data is acquired in the form of an electronic document. The document may then be accessible throughout the system. A document may undergo changes to its content. Changes may then be further modified, removed, and new changes may be added which may be modified and removed. Document changes and modifications to changes may be stored within a document and viewable throughout a study to system users who have sufficient user access. In one embodiment of the present invention, a primary investigator 3320 may access a document and all its changes and make modifications to the document based on the primary investigator's 3320 user access rights. These modifications are similar to other document modifications in that they become a part of an overall document. Other users of a system include, but are not limited to, sponsors 3310 and auditors 3330. For a given clinical study, there may be many of each type of user, there may be one of each type, there may be none of some types, and there may be any combination of the previously mentioned situations. Auditors and sponsors, among other users, may access study documents through a computer network 3000, locally and remotely, including through the use of reports and notifications sent by the invention. A study may be managed by a primary investigator 3320. A mobile computing device 3100 may be used to collect clinical study data. Information and data gathered for a study may be stored in a machine-readable medium such as memory. The memory may be located on a mobile computing device 3100, a coordinating system 3200, and a data storage system 3500. Outside sources 3400 may be contacted for a study. A coordinating system 3200 may be used for, among other things, acquiring clinical study information, sending notifications regarding a study, and storing study information and data, to name a few.

In one embodiment of the present invention, information is acquired from outside sources, such as electronic medical records 3410, government compliance websites 3420, and cloud computing systems 3430, to name a few examples. A clinical study management system may be connected to outside sources by a computer network 3000. In acquiring the information and data through computer network 3000, a system may connect to an outside computer device as the initiator of the communication and it may connect passively in receiving the information and data. Some examples of the information acquisition include, but are not limited to, acquiring clinical study information 2100 and capturing visit data 2300, among others. The information and data acquired may be in electronic format, they may originally exist as physical documents, and they may exist in other formats such as, for example, as magnetic and optical information. In one embodiment of electronic acquisition of clinical study information, a study coordinator system 3200 electronically receives protocol information 2110 from an outside source 3400 through computer network 3000. This information may be converted to a common format to be used throughout the invention. Some illustrative examples of conversion include, but are not limited to, optical scanning, manual input, and software translation, to name a few. In one embodiment of the present invention, physical documents are optically scanned into electronic format providing an electronic image of the original document which may be available throughout a clinical study. The scanned documents may be used as images and as textual data. Data received as images may be converted to textual format and data received in textual format may be converted to images. Documents may also be stored by the present invention for access and storing, among other reasons. One illustrative benefit of electronic access to the original document is providing an easier and more convenient method of auditing.

Notifications may be sent to appropriate members of a clinical study system in reaction to designated events. These events include, but are not limited to, the viewing of a document; a document not being viewed, for example, in a given time period; reaching a particular step of a study, a network communication event, and an expiration of a time period, to name a few. Notifications may be sent through a computer network 3000 to another device on the study system, the same device, and a device outside the study system. Notifications may be sent to system users, to system databases, to users and databases outside the system, and to devices within and outside a system. In one embodiment of the present invention, a notification may be sent to users with appropriate access privileges. A facsimile machine may also be used in sending and receiving patient data for a clinical study. A phone number for a facsimile machine may be dedicated to a particular study such that a document faxed to that number may be designated for the corresponding patient and study.

Reports may be generated by and about a clinical study. Some illustrative examples of information that may be contained in such reports include patient data, tracking information, and updates to a clinical study, to name a few. Tracking information may include, but is not limited to, gathered patient data, study protocols, compliance requirements, user access permissions, and metadata. These and other reports may be sent in electronic and physical format to a designated receiving address. Reports may be generated on a periodic basis, a triggering event, and as needed. Reports may be generated remotely. Reports may be sent through a computer network 3000 to users and databases, both within and outside a clinical study system. Reports may also be sent directly to a physical format by use of a printer, facsimile machine, and other printing device.

An auditor 3330 may access a cloud computing system 3430 through a computer network 3000 and authentication by the cloud computing system 3430. Authentication may be biometric and it may be through entry of the auditor's 3330 username and password. Some methods of biometric authentication include, but are not limited to, fingerprint, retinal scan, and heat signature, to name a few. Since the cloud computing system 3430 may be accessed through the internet by all users, the auditor as a user may access a study remotely through a computer network 3000. This remote access may be initiated from any computing device 3100 with access to a computer network. The computing device 3100 may be a personal computer, tablet PC, mobile phone, or any other device commonly used to access a computer network. Therefore, the user's location may be wherever the user desires to be and need not be at the same location where the clinical study is being implemented. Auditing can be done securely and remotely through user authentication, for example through coordinating system 3200, and a computer network 3000.

Figure 4:
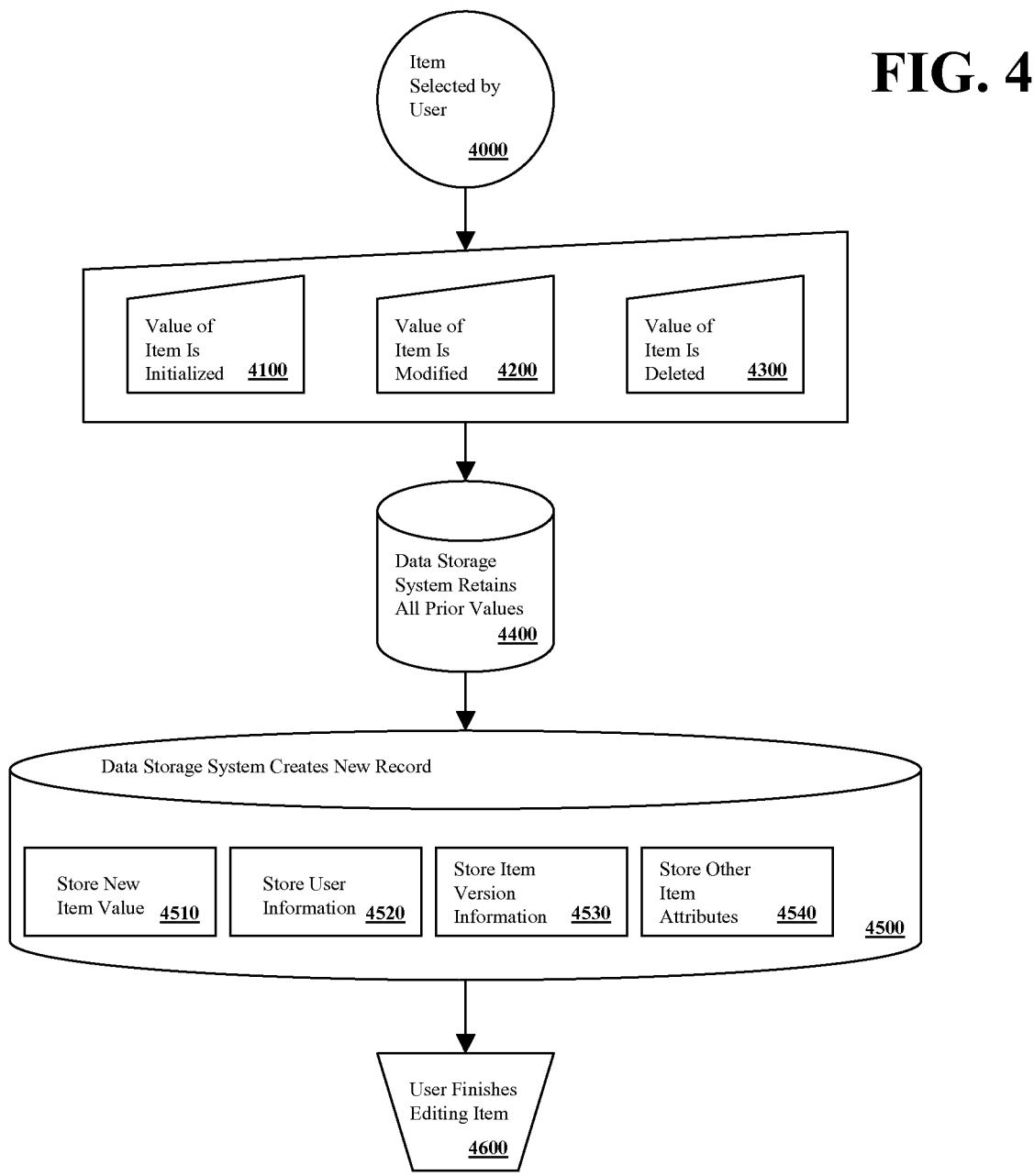
FIG. 4 is a flow chart illustrating a method of item-level implementation and security of a clinical study management system according to one embodiment of the present invention.

The present invention is also directed to a method of tracking data modifications. Tracking modifications may include functional aspects including, but not limited to, communicating through a computer network, utilizing computer memory, storing data on a computer readable medium, and taking action based on user input. One illustration of such a method is represented in FIG. 4. This diagram is merely an illustration of one embodiment of the present invention and should not be viewed as limiting the inventive concept. Furthermore, the shapes chosen to represent some elements of the invention are only illustrations and should not be viewed as limiting, even though the shapes may have specific meanings in other flow charts and in differing aspects of this flow chart. In one embodiment of the present invention, a particular value for an item of data or information may become part of a clinical study system 3430 even before a user has logged into the system if, for example, the value is a default setting assigned by a clinical study system, among other possibilities. A value may also become part of a clinical study system when a user 3320 is authenticated by the system and selects the item value to be edited by, for example, touching a display screen where the item is located, among other methods of selecting an item 4000. A user may then affect a value of the item by setting it 4100, changing it 4200, or deleting it 4300. The value of the item before user selection will be retained 4400 by a clinical study system, although it may be designated as a past value. A newly modified value may then be designated as the current value. Both these values and all other previously and future modified values may be retained in a data storage system 4400 for the duration of the study and beyond. A new value assigned to the item, if any, by the user may be stored 4510 in a data storage system, it may be associated with corresponding user information 4520 of the user currently logged in and selecting the item, and it may be designated for currency 4530 within the system. This association of a username and version designation makes clear the modification trail for later review and auditing, if needed. A data storage system 1200 may create a new record 4500 when a user has finished editing an item 4600. The new record 4500 may include, among other things, the new item value 4510, the username 4520, and other item attributes 4540 such as date, time, permissions privileges, and version identifier 4530, to name a few. These attributes and the graphical and efficient use of them by the clinical study system 3430 allow for integrity of data and secure, efficient, verifiable auditing. In addition to these attributes existing in a data storage system 3500, they are also viewable through graphical display within a clinical study system 3430, allowing for a level of data integrity between storage and display on a computing device 3100 connected to a clinical study system.

In addition to acquiring information from outside sources, the present invention may also acquire information from within the system. Some illustrative examples of how information may be acquired include, but are not limited to, electronically, telephonically, magnetically, optically, verbally, and through manual input, to name a few methods. In accepting manual input, some appropriate methods include, but are not limited to, keyboard input, and finger and stylus input, to name a few. All data and information acquired by the cloud computing system, whether received from an outside source or retrieved and brought back by the system, are stored in data storage system 1210. When adding a single item of data or information to the data storage system, a record is created by the system that identifies the item as associated with unique attributes to ensure an accurate audit trail is created within the data storage system. Some of these attributes include but are not limited to, a username of the user entering or receiving the item and a date and time of receiving or entering the item. Every item of data or information stored in the system is associated with a username and a date and time associated with when the item became part of the system, in addition to other record-keeping attributes stored in the item record. Some other attributes associated with an item are a clinical study identifier and a permissions indicator, to name just a couple. A permissions indicator may, among other things, indicate to the system which users are permitted to access the individual item. Users without appropriate privileges would be unable to view items inaccessible to them. Another attribute stored in data storage system and associated with each item is a version indicator. A version indicator may, among other things, indicate to a clinical study system a history of that item relative to other items and to the clinical study system. In one embodiment of the present invention, a user with sufficient privileges, for example a study auditor, may audit a clinical study system by remotely logging into the system from the user's mobile phone through a computer network. The study auditor may then review an item such as patient's blood pressure and see all the different values for that item over the duration of a clinical study. The study auditor can also see which other users were responsible for changing the different values of an item, for example a patient's blood pressure.

There are many items of data and information that aggregate to form a patient or visit chart. These charts quickly become full of important information and are crucial to a clinical study. The present invention, among other things, organizes all relevant information, records entry dates, attributes additions and modifications to a particular user, and displays chart information legibly and graphically. In one embodiment, a data item is entered into a data storage system and a clinical study system associates the current date and time with the item, as well as the username of the user currently logged in, and also a version identifier. That item may be subsequently changed any number of times. At a still later time, a user with appropriate privileges may review all the previous values and changes of the item and revert the value of that item to the value first mentioned above. This most recent change would then be the latest value for the item and all other previous values and attributes will remain in the record for later review and modification, if necessary. This item, other items, and attributes of items may then become part of the medical chart. This is true for paper charts as it is for electronic charts. The advantage of electronic charts over paper charts here is obvious for purposes such as clarity, integrity, and portability, among others. Where paper charts are stacks of pages passed around, written illegibly, with text scratched out and erased with a reliance on documenting and keeping up with the latest changes, in the present invention each item modification is added to a data storage system. A clinical study system's administration, organization, and display of items and item attributes make an electronic medical chart even more functional.

Document libraries may be used to store data and information of a clinical study. Data and information may include, but are not limited to, unstructured data, images scanned into electronic format, and document templates. Data and information which were previously only in physical document format may then be accessed electronically upon demand, for example, as in a step of auditing a clinical study. A document library may also contain structured data and data generated by the present invention. There may be more than one document library on a clinical study system, including one or more archived document libraries, and the invention may access a document library outside the system through computer network 3000. Document libraries may reside on a separately designated computing device on the system, on a cloud computing system, on the primary computing device of the system, and on a computing device outside the system.

What is claimed is:

1. A device for managing a medical chart comprising:
   at least one processor; and
   at least one memory storing computer-readable instructions, wherein the at least one processor is operable to access the at least one memory and execute the computer-readable instructions to:
     store, on the at least one memory, one or more data records of the medical chart;
     associate an access level with the one or more data records, the access level comprising:
       a first access level associated with a first of the one or more data records,
       a second access level associated with a second of the one or more data records, and
       a third access level associated with a third of the one or more data records;
     display the one or more data records based at least in part on the access level;
     restrict modifications of the one or more data records based at least in part on the access level;
     store, on the at least one memory, the modifications wherein storing the modifications comprises storing a current value, a prior value, and the access level of the one or more data records;
     store, on the at least one memory, an auditor username and timestamp associated with the modifications; and
     store, on the at least one memory, a current version and prior versions of the one or more data records, the current version comprising modified values of the one or more data records, the prior versions comprising all previous values of the one or more data records.

2. The device of claim 1, wherein the at least one memory comprises at least one remotely located memory.

3. The device of claim 1, wherein the computer-readable instructions are further operable to designate a prior version as the current version of the one or more data records, based on the user authentication.

4. The device of claim 1, wherein the computer-readable instructions are further operable to automatically update a price data record based at least in part on the modifications.

5. The device of claim 1, wherein the modifications are accepted via a touch-screen display.

6. A method of charting and auditing medical information, the method comprising:
   storing, on the at least one memory, one or more data records of the medical information;
   associating an access level with the one or more data records of the medical information, the access level comprising:
     a first access level associated with a first of the one or more data records;
     a second access level associated with a second of the one or more data records; and
     a third access level associated with a third of the one or more data records;
   displaying the one or more data records based at least in part on the access level;
   restricting modifications of the one or more data records based at least in part on the access level;
   storing, on the at least one memory, the modifications wherein storing the modifications comprises storing modified values of the one or more data records and storing prior values of the one or more data records;
   storing, on the at least one memory, an auditor username and timestamp associated with the modifications; and
   storing, on the at least one memory, a current version and prior versions of the one or more data records, the current version comprising modified values of the one or more data records, the prior versions comprising all previous values of the one or more data records.

7. The method of claim 6, wherein the at least one memory comprises at least one remotely located memory.

8. The method of claim 6, further comprising updating a cost data record based on a modification.

9. The method of claim 6, further comprising associating the modifications with a unique version identifier, wherein the unique version identifier is stored on the at least one memory.

10. The method of claim 9, further comprising selecting a group of prior modifications, from two or more groups of prior modifications, wherein each of the two or more groups of prior modifications are associated with a unique version identifier.

11. A system for auditing an electronic medical chart, the system comprising:
    at least one processor; and
    at least one memory storing computer-readable instructions, wherein the at least one processor is operable to access the at least one memory and execute the computer-readable instructions to:
      store, on the at least one memory, one or more data records of the electronic medical chart;
      associate an access level with the one or more data records, the access level comprising:
        a first access level associated with a first of the one or more data records,
        a second access level associated with a second of the one or more data records, and
        a third access level associated with a third of the one or more data records;
      display the one or more data records based at least in part on the access level;
      restrict modifications of the one or more data records, based at least in part on the access level;
      store, on the at least one memory, the modifications wherein storing the modifications comprises storing modified values of the one or more data records and storing prior values of the one or more data records;
      store, on the at least one memory, an auditor username and a timestamp associated with the modifications; and
      store, on the at least one memory, a current version and prior versions of the one or more data records, the current version comprising modified values of the one or more data records, the prior versions comprising all previous values of the one or more data records.

12. The system of claim 11, wherein the at least one memory comprises at least one remotely located memory.

13. The system of claim 11, wherein the computer-readable instructions are further operable to automatically update a price data record based at least in part on the modifications.

14. The system of claim 11, wherein the display is further operable to receive input from a user.

15. The system of claim 11, wherein a group of modifications is associated with the username and the timestamp, and wherein a version identifier comprises the username and the timestamp.

16. The system of claim 11, wherein prior values of the one or more data records are available to be designated by a user as current values of the one or more data records, based at least in part on the access level.

17. The system of claim 11, wherein the display comprises a remotely located display.

18. The device of claim 1, wherein the computer-readable instructions are further operable to store at least two prior versions of the one or more data records in addition to the current version of the one or more data records.

19. The device of claim 3, wherein the current version of the one or more data records can be designated from one of at least two prior versions of the one or more data records.

20. The device of claim 1, wherein the computer-readable instructions are further operable to execute a billing process based at least in part on the modifications.

* * * * *